March 17, 1959 — H. G. RICH — 2,877,791
FLEXIBLE DIAPHRAGM FLOW CONTROL VALVE
Filed Aug. 15, 1955 — 4 Sheets-Sheet 1
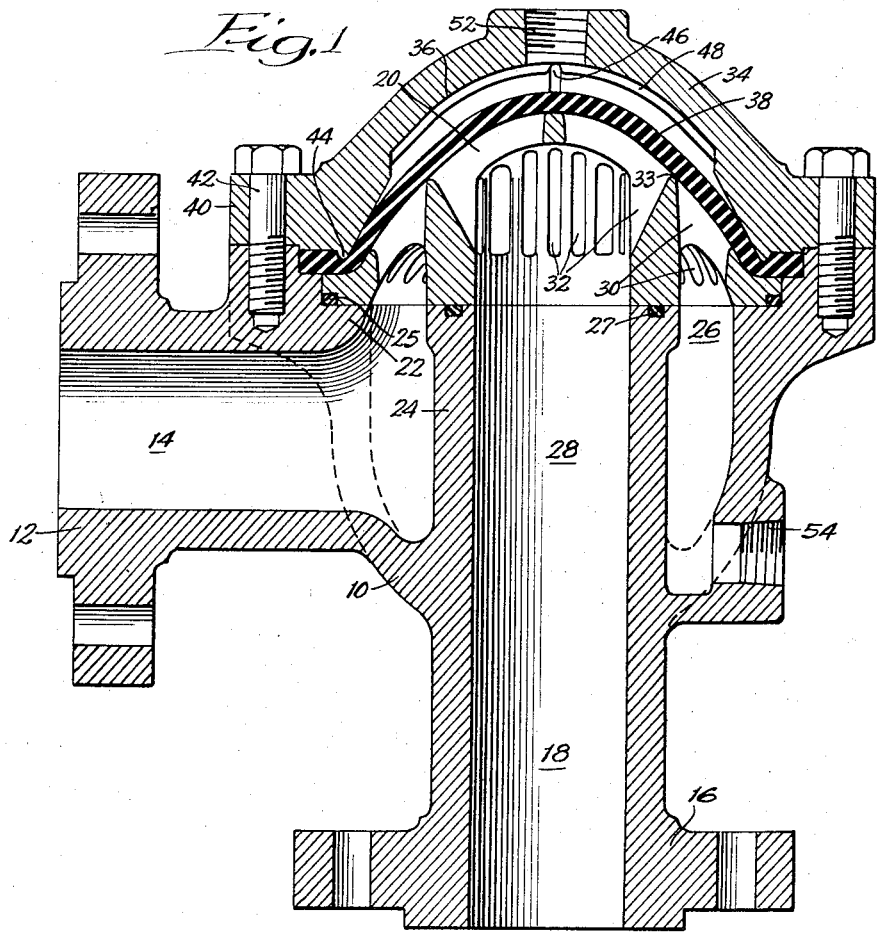
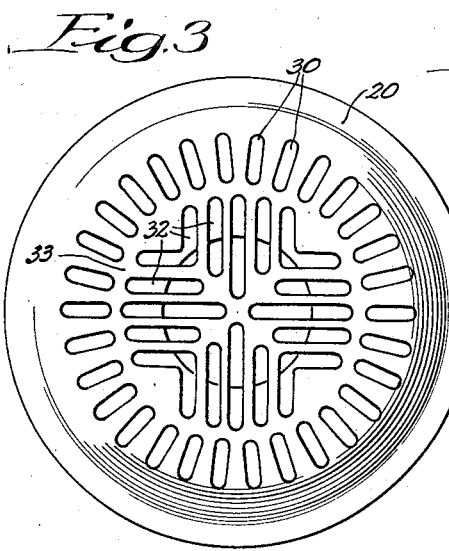
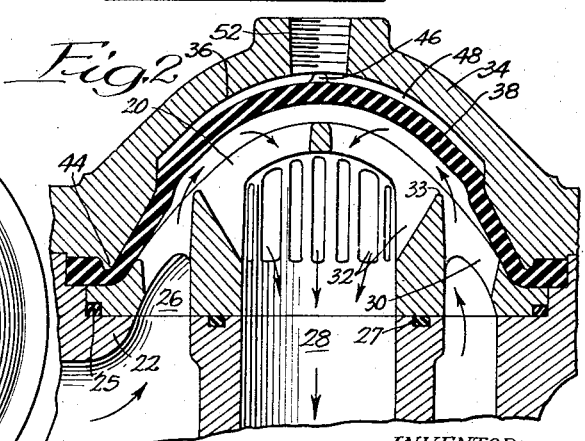
INVENTOR:
Herbert G. Rich,
BY Bair, Freeman & Molinare
ATTORNEYS.

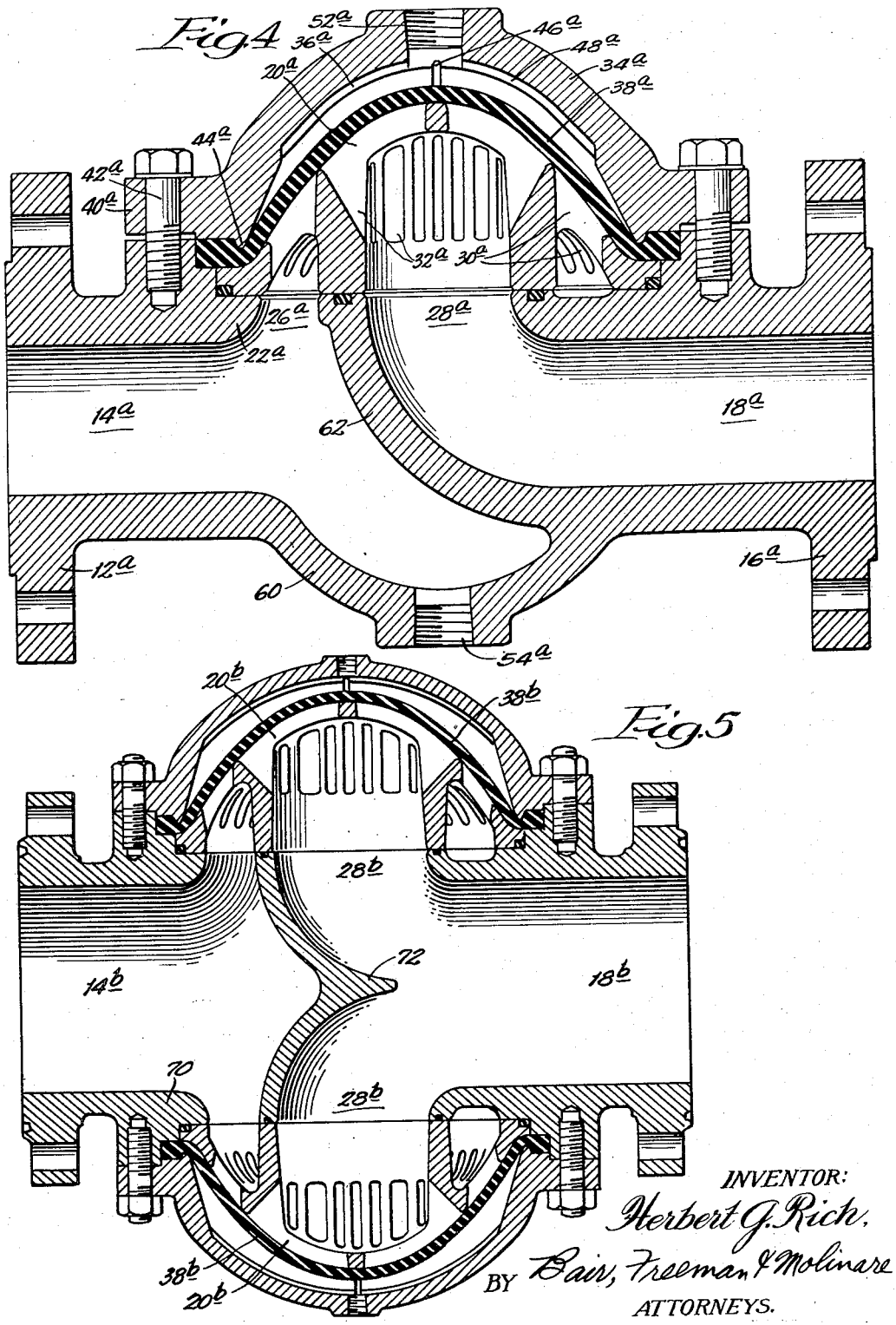

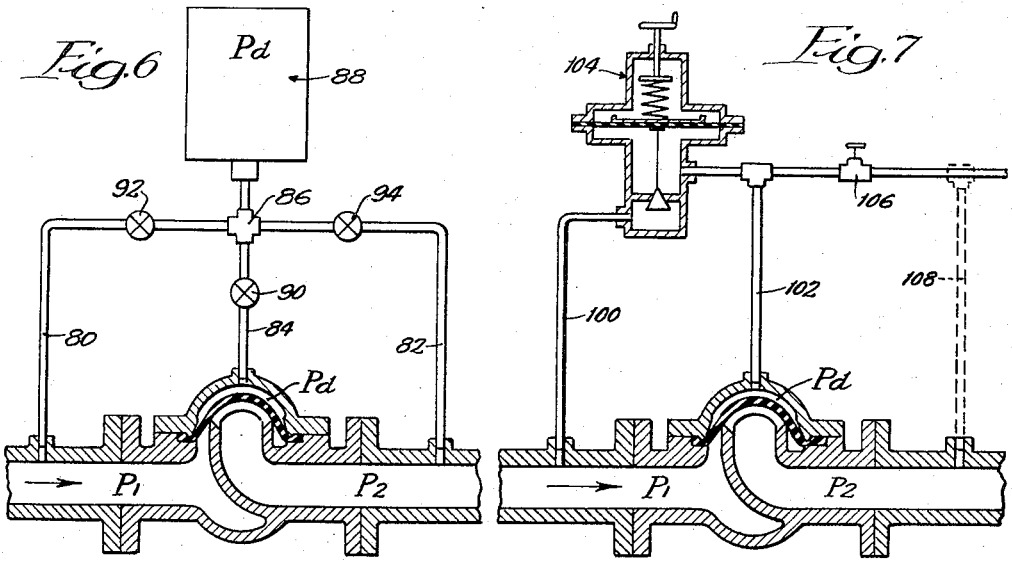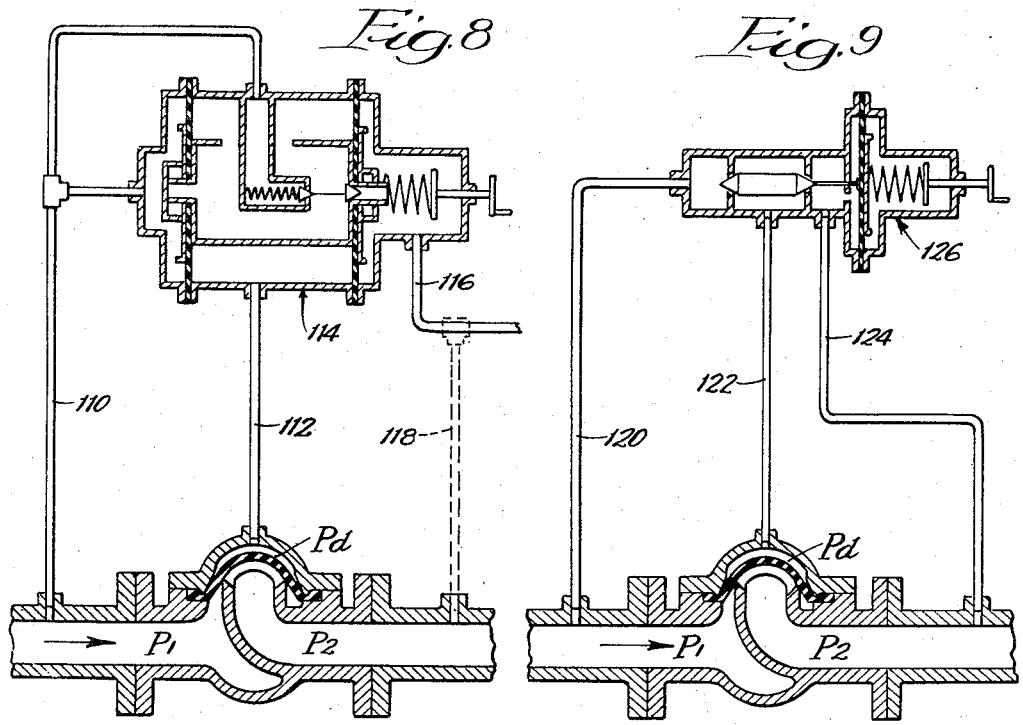

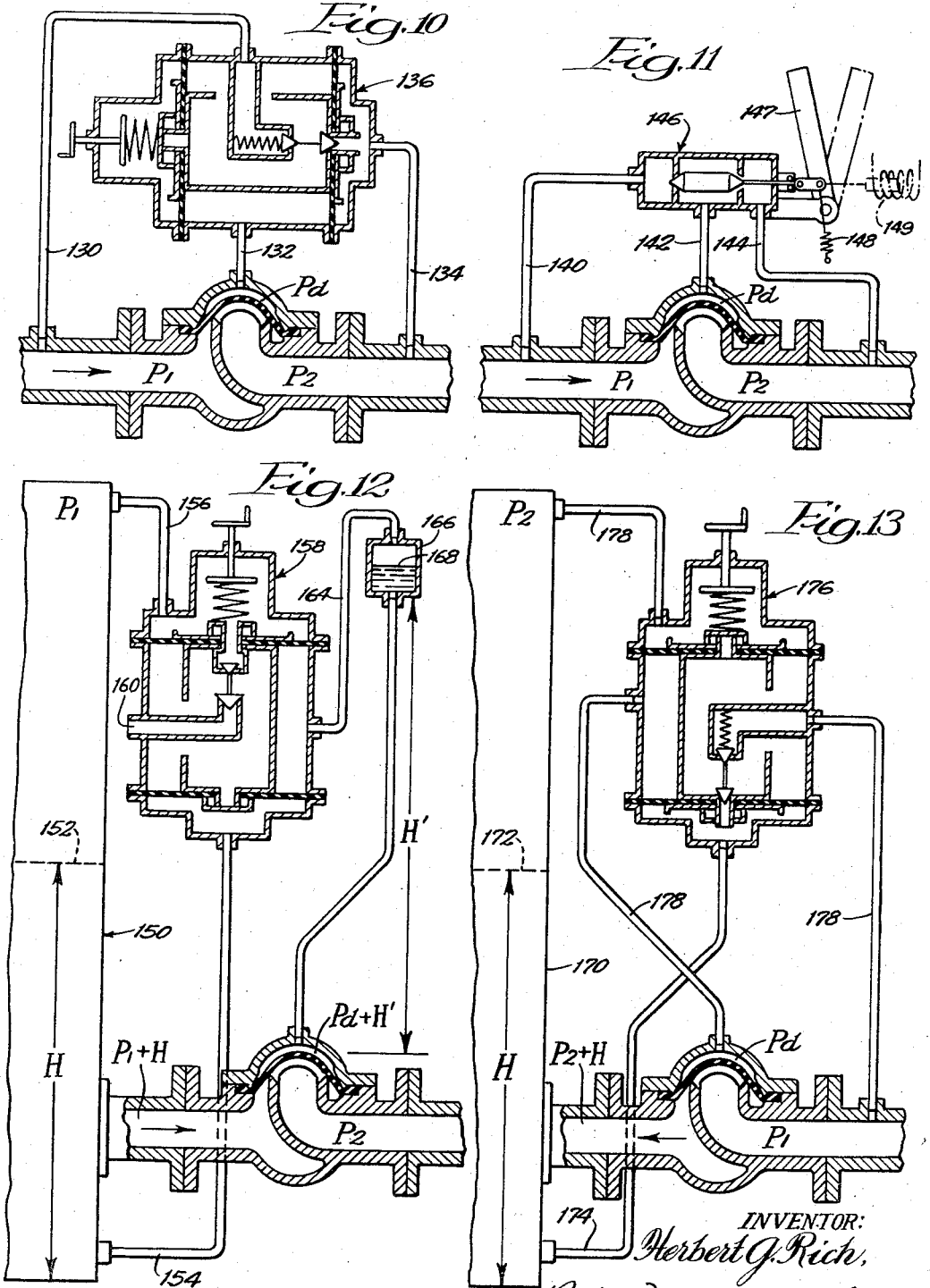

United States Patent Office 2,877,791
Patented Mar. 17, 1959

2,877,791

FLEXIBLE DIAPHRAGM FLOW CONTROL VALVE

Herbert G. Rich, Marshalltown, Iowa, assignor to Fisher Governor Company, Marshalltown, Iowa, a corporation of Iowa Application August 15, 1955, Serial No. 528,306

9 Claims. (Cl. 137—487)

This invention relates generally to a flexible diaphragm control valve and flow system, and more particularly to a novel valve construction employing a flexible diaphragm.

It is a primary object of this invention to provide a flexible diaphragm flow control valve of substantially improved efficiency and reliability, wherein the flexible diaphragm is stretch-supported in a novel manner by a grid means of dome-shaped form.

It is another object to provide an expansible member valve for use in a flow control system, wherein the valve may be readily disassembled in the field without removal of the valve body from the pipe line, and wherein the valve design may be readily adapted to either globe or angle body constructions of both single and multiple diaphragm form.

It is a further object to provide a basic valve body structure for a flexible diaphragm flow control device, which can be readily adapted for use as either a pressure reducing valve, a back-pressure valve, a manually operated snap-acting valve, or a liquid level control valve, without structural change or adjustment by the cooperating attachment of appropriate interchangeable pilot operating mechanisms.

It is still another object to provide a valve design of the expansible member type in which the member supporting structure can be readily manufactured at low cost.

It is still a further object to provide an expansible member valve which can be shut off tightly with operating pressures not in excess of the valve inlet pressure.

It is yet another object to provide an expansible member valve which can be readily operated by fluid flow through the valve body in either direction.

It is yet a further object to provide an expansible member valve which avoids fluttering of the diaphragm at all flow rates, and which is particularly characterized by good stability at low flow rates.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a vertical cross-sectional view showing a flexible diaphragm flow-control valve constructed in accordance with the present invention and utilizing an angle body design, wherein the diaphragm is shown in closed flow position of seated engagement upon the supporting grid;

Figure 2 is a fragmentary cross-sectional view of the construction shown in Figure 1, wherein the flexible diaphragm is shown in an open-flow position stretched in spaced relation above the supporting grid;

Figure 3 is a top plan view of the diaphragm supporting grid;

Figure 4 is a vertical cross-sectional view similar to Figure 1, showing another embodiment of the present invention utilizing a globe body of aligned inlet and outlet design;

Figure 5 is another view similar to Figures 1 and 4, showing a still further embodiment of the present invention, wherein a pair of expansible members are combined in a single globe body structure; and Figures 6 through 13 are diagrammatic layout views, partly in vertical cross section, showing the alternative and interchangeable use of a plurality of pilot regulating devices for modifying the valve construction of the present invention to a variety of control operations without change or adjustment of the valve structure.

Referring now more particularly to Figures 1 to 3 of the drawing, I have shown a first embodiment of the present invention utilizing an angle body design arrangement. A hollow valve body 10 of angle-type construction provides an inlet fitting 12 defining an inlet passageway 14, and an outlet fitting 16, defining an outlet passageway 18. In this way, an inlet and outlet flow having a 90° change in direction is provided.

A grid 20 of unique form provides a convex dome-shaped supporting surface which is generally circular in horizontal cross-section and generally parabolic in vertical cross-section, thereby providing a dome of generally hemispheric or paraboloid. The body 10 provides an outer annular shoulder 22 and an inner annular wall 24, arranged concentrically relative to each other. The shoulder 22 and wall 24 serve to define an annular inlet passage 26 therebetween, and the inner wall 24 defines a centrally located circular outlet passage 28. The grid 20 is supported upon the shoulder 22 and wall 24, and suitable O-ring seals 25 and 27 are provided for flow-tight assembly of the grid 20 and supporting portions of members 22 and 24.

The grid 20 is formed with a plurality of particularly arranged slotted passageways defining a plurality of outer flow ports 30 arranged in a circular pattern, wherein the length and height of each port are radially and axially aligned, respectively, relative to the grid geometry. A plurality of inner flow ports 32 are arranged in a centrally disposed cross-like pattern, wherein the ports are convergent toward the dome axis. The inner flow ports 32 lie generally above the outer flow ports 30 because of the upwardly convex formation or dome-shape of the grid 20.

The annular upper surface of the dome 20 which lies intermediate the two patterns of flow ports 30 and 32 serves to define a valve seating surface 33. The flow ports 30 which lie outwardly of the valve seat 33 register with the annular inlet passage 26 for communication therethrough with the valve inlet passageway 14. The flow 32 which lies inwardly of the valve seat 33 register with the circular outlet passage 28 for communication therethrough with the valve outlet passageway 18.

A diaphragm casing member 34 is mounted on the valve body 10 in a position overlying the grid 20, and serves to define a plenum chamber 36 of generally dome shape. A flexible diaphragm 38 is stretched downwardly over the grid 20 and has its outer periphery fixedly held in tightly engaged relation upon the outer edge of the grid 20 by means of a mounting flange portion 40 of the diaphragm casing 34. The flange 40 is rigidly connected to the valve body 10 by means of a plurality of connector bolts 42. In this way, the diaphragm is normally tightly stretched into close-fitting contacting engagement with the upper surface of the grid 20 so as to effect seating engagement upon the valve seat 33 and overlying sealing cooperation with the flow-ports 30 and 32. In order to insure a tight assembly of parts and preclude slippage of the diaphragm 38, the casing 34 is formed with a downwardly-projecting annular anchor shoulder 44 to tightly compress the diaphragm 38 adjacent its outer periphery.

The diaphragm casing 34 provides a dome-shaped abutment surface overlying the diaphragm 38 and grid 20. A plurality of slots 46 are formed in a radially arranged pattern so as to define a plurality of radial ribs 48 along the abutment surface. It will be apparent that stretching of the diaphragm 38 upwardly away from the grid 20 will be limited by engagement against the abutment ribs 48, as seen in Figure 2.

The slots 46, which serve to define the abutment ribs 50, converge centrally at a loading pressure inlet opening 52 which extends through the diaphragm casing 34. In this way, an operating or regulating pressure may be introduced into the diaphragm casing 34 above the diaphragm 38. Inlet fluid flow through passageway 14 and passage 26 will be normally obstructed by the portion of the diaphragm 38 which overlies the outer flow ports 30. The sealing forces of the diaphragm will be determined by the extent of stretch-tensioning of the diaphragm over the grid 20 upon initial assembly of the valve construction, and by the supplemental loading pressure exerted by the introduction of a regulating fluid within the portion of the chamber 36 which overlies the surface of the diaphragm 38 opposite the grid 20. When the pressure of inlet fluid exceeds the sealing force exerted by and upon the diaphragm 38, the flexible nature of the diaphragm 38 will permit a stretching or annular "peeling-off" of the diaphragm from its outer periphery inwardly and upwardly over the dome surface of the grid 20 toward the center thereof. As this occurs, the diaphragm 38 will be raised above the valve seat 33, thereby providing free flow access through the flow ports 30 over the valve seat 33 and downwardly through the flow ports 32 into the output passages 28, 18. This relation of parts is clearly shown in Figure 2 of the drawing.

It will be apparent that a maximum rate of flow will be predetermined by the limiting upper position of diaphragm engagement with the abutment ribs 50. Intermediate positions of the diaphragm 38 will vary the shape and dimensions of the dome-shaped flow conduit over the valve seat 33, so as to effect regulation of the rate of flow from inlet into outlet. Intermediate positions of the diaphragm 38 may be effectively regulated by controlling the pressure induced through the loading inlet 52. A closing pressure will be uniformly distributed over the upper diaphragm surface when the diaphragm is tightly engaged against the ribs 48 of the diaphragm casing by means of the radial slots 46.

A suitable inlet pressure access fitting 54 is provided for flow communication with, and sensing of, the inlet pressure to the lower surface of the diaphragm 38. Such a sensing of the inlet pressure may then be employed to effect operation and regulatory response of a pilot mechanism for controlling the introduction of a loading pressure through the inlet 52. The operation of the valves of the present invention in combination with a variety of pilot regulating devices will be hereinafter described in detail.

The particular form and shape of the grid 20, and the particular location and cooperative interrelation of the flow-ports 30 and 32 extending therethrough, constitute an extremely important feature of the present invention. The slot-like shape of the flow-ports 30 and 32 is such that as the diaphragm "peels off" upwardly toward the top-center of the grid during an increase of flow through the valve, no stepwise flow change will result. A uniformly continuous flow path over the valve seat 33 is provided for all positions of diaphragm clearance above the grid 20, from slightly open to fully stretched engagement with the diaphragm casing abutment ribs 48.

The width of the flow ports or slots 30 and 32 must be correlated to the physical strength of the diaphragm and its stretch characteristics so that under extreme shut-off conditions, the rubber composition material will not be extruded inwardly through the flow-ports 30 and 32. The rounded dome shape of the convex upper surface of the grid 20 must be smooth and devoid of sharp edges so as to prevent any abrading or excessive wear of the rubber diaphragm under operating conditions. The dome shape of the grid 20 is especially necessary to provide an effective means for stretching the diaphragm into sealing engagement against the entire grid surface. This stretching engagement of the diaphragm with the grid enables the valve to be tightly shut off against a line pressure equal to the loading pressure above the diaphragm within the chamber 36.

The total area of each of the sets of flow ports 30 and 32 are approximately equal, so that the area for flow through the outer or inlet portion of the grid, and the area for flow through the inner or outlet portion of the grid, are substantially the same, whereby the valve may be effectively operated in either direction of body fluid flow. It is important that the dome shape of the grid 20 be proportioned to the inner dome surface of the diaphragm casing 34 so that the lift of the diaphragm above the valve seat is sufficient to allow full flow, but is not so great as to enable over-stretching of the diaphragm. In this way, the maximum flow permitted by the size of the grid slots or flow ports will be readily allowed when the diaphragm is in tightly stretched engagement with the abutment ribs 48 of the casing 34, but no significantly greater quantity of fluid flow is possible, thereby precluding over-stretching of the diaphragm and consequent "fluttering." Since flow through the grid occurs immediately above the valve seat, it is desirable to gradually reduce the distance between the diaphragm and the overlying casing from the periphery toward the crown. In addition, the inlet ports 30 and the outlet ports 32 are located relatively close to each other to define a relatively narrow annular contact surface for the valve seat 33, thereby minimizing the range of unstable flow conditions at small valve openings.

From the standpoint of efficient and low cost manufacture, the design of the grid 20 and the slots or flow ports therethrough is such that the entire grid may be readily cast from a relatively simple pattern which is capable of being completely drawn from opposite directions. The unitary one-piece design of the grid member also serves to facilitate assembly and disassembly for servicing and repair.

The flexible diaphragm 38 must be formed of a resilient material which is not susceptible to being over-stretched when expanded to its maximum flow clearance position of contacting engagement with the abutment ribs 48 of the diaphragm casing 34. The material is preferably an uncorded rubber, selected on the basis of its particular end application with special attention to stress fatigue and abrasion resistance. Despite severely demanding operating conditions, the flexible diaphragm control valve of the present invention will have substantially greater resistance to abrasion and wear than a conventional globe type of valve, because of the ability of the resilient sealing diaphragm to compensate for considerable wear of cooperating metal components.

The fluid flowing through the valve is not restricted to either liquid or gas, but only to those fluids which will not react chemically with the materials of the various valve ports. Further, the fluid used to load the diaphragm for flow regulation may also be either liquid or gas.

The valve of this invention consists of four essential parts, including the valve body which provides a conduit for the fluid being controlled; the grid which provides a supporting structure for the expansible member during valve shut-off and which contains the aperture through which the body fluid must flow; the flexible composition diaphragm which is stretched by the body fluid pressure to form the clearance over the grid through which the body fluid flows; and the diaphragm casing which stretches the diaphragm down over the grid, and which provides inner contours to limit the expansion of the diaphragm, and which defines an enclosing chamber for applying the loading pressure to the diaphragm for controlling the extent of its expansion.

Numerous modifications and alternative embodiments of the valve construction may be employed within the basic scope of the present invention, and two typical modifications are disclosed herein and illustrated by Figures 4 and 5. Referring now more particularly to Figure 4, I have shown a modified construction which utilizes a globe body having longitudinally aligned inlet and outlet passageways. Substantially identical parts previously designated in Figure 1 are indicated by the same reference numerals with the added letter "a," and will not be redescribed in detail. The only difference in the construction of Figure 4 over that of Figure 1 relates to the form of the body casting. A hollow valve body 60 of globe type design is employed, and provides longitudinally aligned inlet and outlet passageways 14a and 18a separated by a grooved partition wall 62 which replaces the straight-sided annular wall 24 of the body 10 of Figure 1. The partition wall 62 serves to cooperate with the grid 20a in the same way as the structure of Figure 1, but provides an angularly curved outlet passage 28a for flow into the passageway 18a.

Referring now to Figure 5 of the drawing, I have shown a further embodiment, wherein a pair of flexible diaphragm control valves are included within a single valve structure. Identical parts heretofore described in connection with Figure 1 are designated by the same reference numerals with the added letter "b." A valve body 70 is provided with a double-curved partition wall 72 extending transversely across the valve body between the longitudinally aligned inlet and outlet passageways 14b and 18b. The partition wall 72 provides a pair of opposed angular bends for flow communication with the outlet passageway 18b, and also cooperates with the valve body to define a pair of diametrically opposed circular outlet passageways 28b. In this way, a pair of flexible diaphragm valves, each of which is substantially identical with the single structure shown in Figure 4, are provided.

The multiple valve construction of Figure 5 may also be adapted to an angle design arrangement by 90° rotation of the outlet portion of the housing. It will be apparent, therefore, that the valve design disclosed may be readily adapted to angle body, globe body, and both angle and globe body multiple arrangements without any change in the structural parts except for the body castings.

Although a direction of fluid flow has been indicated by designating structural portions of the various valve arrangements disclosed as "inlets" and "outlets", it is important to note that the direction of flow may be reversed in each embodiment.

The manner in which the flexible diaphragm of the control valve disclosed by the present invention is subjected to a regulatory pressure loading constitutes a very important aspect of this invention. It is a highly important characteristic of the valve constructions disclosed that selection of a particular pilot means for effecting diaphragm loading serves to adapt the valves for operation as either pressure reducing, back pressure, manually operated snap-acting, or liquid level control devices, without structural change or modification of the valve itself. The basic valve structure may be readily adapted to a wide variety of valving operations by mere interchangeable selection of an appropriate pilot operating mechanism. In Figures 6 through 13, I have illustrated a variety of system arrangements employing various pilot operating mechanisms with exactly the same valve structure. For purposes of illustration, a valve of the type shown in Figure 4 has been used throughout.

In Figure 6, I have shown a dome-loaded relief valve arrangement. An upstream pressure line 80 communicates with the main flow line upstream of the valve inlet 14, as indicated by the flow arrow, and a downstream pressure line 82 communicates with the main flow downstream of the valve outlet 18. A loading pressure line 84 communicates through the loading pressure inlet opening with the interior of the main valve diaphragm casing. A coupling 86 provides a junction point for the pressure lines 80, 82, 84, for communication therethrough with a common volume chamber 88. A restriction and isolating valve 90 is located in the pressure line 84 between the main valve and the fitting 86. A normally closed admission valve, which may be opened to increase back pressure, is located in the pressure line 80 between the main flow line and fitting 86. Alternatively, an optional independent fluid supply source may be employed instead of the line connection to the upstream side of the main flow line. A normally closed bleed valve 94, which may be opened to decrease the back pressure, is located in the pressure line 82 between the main line and the fitting 86. Alternatively, the bleed valve may be vented to atmosphere instead of the line connection to the downstream side of the main flow line.

The upstream main line pressure or back pressure has been designated $P_1$, and the downstream main line pressure or demand pressure has been designated $P_2$. The desired diaphragm loading pressure is designated $P_d$, and corresponds to the pressure within the volume chamber 88. By this arrangement, the main valve of the present invention is readily adapted for relief valve operation without any change or adjustment of the valve structure.

In Figure 7 I have shown a relief valve arrangement of the pressure loaded type, wherein an upstream pressure line 100 and a loading pressure line 102 communicate with a constant pressure regulator device 104, of conventional type. A bleed orifice 106 is provided for venting of the loading pressure. An alternative optional connection from the bleed orifice 106 to the downstream side of the main line is indicated at 108. By this arrangement, manual adjustment of the pressure regulator spring to provide a desired back pressure $P_1$ will serve to effect pressure loaded relief valve operation. Again, the downstream and diaphragm pressures are designated $P_2$ and $P_d$, respectively.

In Figure 8, a pilot operated relief valve is shown, wherein upstream and loading pressure lines 110 and 112 communicate with an intermittent bleed pilot valve device 114, of conventional type. A bleed line to atmosphere is indicated at 116, and an alternative optional connection to the downstream side of the main line to provide differential relief valve operation is indcated at 118. In this way, manual adjustment of the intermittent bleed pilot valve spring to provide a desired back pressure $P_1$ will serve to effect pilot operated relief valve operation.

In Figure 9, a pilot operated regulator arrangement is shown, wherein upstream, loading, and downstream pressure lines 120, 122, 124 communicate with a three-way pilot valve device 126, of conventional type, which may be manually adjusted to vary its spring loading and thereby provide a desired reduced pressure $P_2$. In this way, a pilot operated regulator is provided by the main valve.

In Figure 10, another form of pilot operated regulator is shown, wherein the upstream, loading, and downstream pressure lines 130, 132, 134 communicate with an intermittent bleed pilot valve 136. A comparison of Figures 8 and 10 will serve to indicate the manner in which the same main valve is adapted to entirely different operating service by the appropriate connection of the pilot mechanism. Manual spring adjustment of the pilot valve 136 serves to provide the desired reduced pressure $P_2$.

In Figure 11 a manually operated shut-off valve arrangement is shown, wherein the upstream, loading, and downstream pressure lines 140, 142, 144 communicate with a three-way pilot valve 146, in substantially the same manner as the arrangement of Figure 9. In place of the manually adjustable spring loading of the pilot valve 126 of Figure 9, the arrangement of Figure 11 utilizes a manual lever operator 147 having a toggle 148. As indicated at 149, automatic solenoid operation of the lever operator 147 may be alternatively provided. In this arrangement, a loading pressure $P_d$ equal either to the back pressure $P_1$ or the demand pressure $P_2$ may be utilized for effecting the vave shut-off.

In Figure 12, a pilot operated dump valve arrangement is shown. A tank 150 having a liquid level 152 therein communicates through a fluid line 154 and a pressure ilne 156 with an intermittent bleed liquid level pilot device 158, of conventional type. The fluid pressure in line 154 corresponds to the liquid height within the tank 150 and has been designated as H. The pressure in line 156 corresponds to the tank pressure above the liquid level 152, and has been designated $P_1$. A bleed passage 160 to atmosphere is provided by the pilot 158. A loading pressure line 164 leads from the pilot 158 to the diaphragm chamber of the main valve. A liquid displacement chamber 166 is located in the line 164 and confines a loading liquid level 168 therein. The liquid level 168 above the main valve diaphragm is greater than or at least equal to the liquid level 152 in the tank 150. The loading pressure provided by the liquid level height 168 above the main valve diaphragm has been designated H′. It will be apparent that the loading pressure output $P_d$ of the pilot 158 is supplemented by the pressure H′. Manual adjustment of the pilot spring to provide the desired liquid level H within the tank 150 will serve to effect pilot operated dump valve operation.

In Figure 13, a pilot operated filling valve arrangement is shown. A tank 170 having a liquid level 172 therein provides a liquid pressure H which communicates through a fluid line 174 to an intermittent bleed liquid level pilot 176. The confined pressure $P_2$ within the tank 170 above the liquid level 172 communicates through a pressure line 178 with the pilot 176. A loading pressure line 178 transmits regulating pressure $P_d$ from the pilot 176 to the diaphragm of the main valve. An upstream line 178 communicates the pressure $P_1$ of the upstream side of the main line, as indicated by the flow arrow toward the tank 170, with the pilot 176. In this way, adjustment of the pilot 176 will serve to provide the desired liquid level H within the tank 170.

Changes may be made in the construction and arrangement of the parts of my flexible diaphragm flow control valve without departing from the real spirit and purpose of my invention, and it is my intention to cover by my claims any modified forms of structure or use of mechanical improvements which may be reasonably included within their scope.

What I claim as new and desire to obtain by Letters Patent of the United States is:

1. A flexible diaphragm flow control device comprising, a hollow valve body having a flow inlet and a flow outlet, grid means providing a supporting structure of convex dome shape disposed within said body intermediate said inlet and outlet, the convex surface of said grid defining an annular valve seat intermediate the grid height, said grid having an inner flow port centrally of and above said valve seat, and an outer flow port peripherally outwardly of and below said valve seat, said outer flow port communicating with said valve flow inlet and said inner flow port communicating with said valve flow outlet, an expansible diaphragm member overlying the convex surface of said grid and having its marginal edge secured to said valve body below said outer flow port, said diaphragm being normally stretched downwardly over said grid in substantially full seating engagement with the convex surface thereof, and means for pressure loading said diaphragm.

2. A flexible diaphragm flow control device comprising a hollow valve body having a flow inlet and a flow outlet, grid means providing a supporting structure of convex shape disposed within said body intermediate said inlet and outlet, the convex surface of said grid defining an annular valve seat, said grid having an inner flow port inwardly of said valve seat and an outer flow port outwardly of said valve seat, said outer flow port communicating with said valve flow inlet and said inner flow port communicating with said valve flow outlet, an expansible diaphragm member overlying the convex surface of said grid, a diaphragm casing defining a plenum chamber overlying the convex surface of said grid and having its marginal edge secured to said valve body below said outer flow port, said diaphragm being normally stretched downwardly over said grid in substantially full seating engagement with the convex surface thereof, and conduit means connecting to said casing for introducing a fluid loading pressure into said plenum chamber to effect pressure loading of said diaphragm toward a position of seating engagement with the convex surface of said grid.

3. A flexible diaphragm flow control device comprising, a hollow valve body having a flow inlet and a flow outlet, grid means providing a supporting structure of convex shape disposed within said body intermediate said inlet and outlet, the convex surface of said grid defining an annular valve seat, said grid having an inner flow port inwardly of said valve seat and an outer flow port outwardly of said valve seat, said outer flow port communicating with said valve flow inlet and said inner flow port communicating with said valve flow outlet, an expansible diaphragm member overlying the convex surface of said grid, a diaphragm casing mounted on said valve body and serving to define a plenum chamber overlying the convex surface of said grid, said diaphragm being normally stretched over said grid in substantially full seating engagement with the convex surface thereof and being peripherally secured below said outer flow port within said valve body by said diaphragm casing, and means for introducing a loading pressure into said plenum chamber to effect pressure loading of said diaphragm toward a position of seating engagement with the convex surface of said grid, said diaphragm casing serving to limit expansion of said diaphragm away from said grid convex surface.

4. A flexible diaphragm flow control device comprising, a hollow valve body of globe form having a flow inlet and an axially aligned flow outlet, grid means providing a supporting structure of convex shape disposed within said body intermediate said inlet and outlet, the convex surface of said grid defining a valve seat, said grid having concentrically arranged inner and outer flow ports at opposite sides of said valve seat, said outer flow port communicating with said valve flow inlet and said inner flow port communicating with said valve flow outlet, an expansible diaphragm member overlying the convex surface of said grid and having its marginal edge secured to said valve body below said outer flow port, said diaphragm being normally stretched over said grid in substantially full seating engagement with the convex surface thereof, and means for pressure loading said diaphragm.

5. A flexible diaphragm flow control device comprising, a hollow valve body of angle form having a flow inlet and an angularly disposed flow outlet, grid means providing a supporting structure of convex shape disposed within said body intermediate said inlet and outlet, the convex surface of said grid defining a valve seat, said grid having concentrically arranged inner and outer flow ports at opposite sides of said valve seat, said outer flow port communicating with said valve flow inlet and said inner flow port communicating with said valve flow outlet, an expansible diaphragm member overlying the convex surface of said grid and having its marginal edge secured to said valve body below said outer flow port, said diaphragm being normally stretched over said grid in substantially full seating engagement with the convex surface thereof, and means for pressure loading said diaphragm.

6. A flexible diaphragm flow control device comprising, a hollow valve body having an inlet passageway and an outlet passageway, said inlet passageway being inwardly divergent to define a plurality of annular inlet flow passages each having an outlet flow passage centrally thereof, said outlet passages being convergently joined at said outlet passageway, a plurality of grid members each providing a supporting structure of convex shape disposed within said body and overlying a corresponding inlet flow passage, the convex surface of each of said grids defining a valve seat, each of said grids having concentrically arranged inner and outer flow ports at opposite sides of the valve seat, said outer flow ports communicating with the corresponding annular inlet passage and said inner flow ports communicating with the corresponding outlet passage, a plurality of expansible diaphragm members each overlying the convex surface of a corresponding one of said grids and having its marginal edge secured to said valve body below said outer flow port, each of said diaphragm being normally stretched over the grid in substantially full seating engagement with the convex surface thereof, and means for pressure loading each of said diaphragms.

7. A flexible diaphragm flow control device comprising, a hollow valve body having a flow inlet and a flow outlet, grid means providing a supporting structure of convex dome shape disposed within said body intermediate said inlet and outlet, the convex surface of said grid defining an annular valve seat intermediate the grid height, said grid having a plurality of inner flow ports centrally of and above said valve seat and a plurality of outer flow ports peripherally outwardly of and below said valve seat, each of said outer flow ports being of elongated slot shape and arranged to provide a radially extending annular inlet flow pattern communicating with said valve flow inlet, and each of said inner flow ports being of elongated slot shape and arranged to provide a centrally inwardly extending outlet flow pattern communicating with said valve flow outlet, an expansibe diaphragm member overlying the convex surface of said grid and having its marginal edge secured to said valve body below said outer flow port, said diaphragm being normally stretched downwardly over said grid in substantially full seating engagement with the convex surface thereof, and means for pressure loading said diaphragm, whereby when the inlet pressure exceeds the sealing force of said diaphragm against said grid, incoming fluid will peel off said diaphragm peripherally inwardly to provide a continuous flow clearance over said valve seat to said flow outlet.

8. A flexible diaphragm flow control device comprising, a hollow valve body having a flow inlet and a flow outlet, grid means providing a supporting structure of convex shape disposed within said body intermediate said inlet and outlet, the convex surface of said grid defining a valve seat, said grid having concentrically arranged inner and outer flow ports at opposite sides of said valve seat, said outer flow port communicating with said valve flow inlet and said inner flow port communicating with said valve flow outlet, an expansible diaphragm member overlying the convex surface of said grid and having its marginal edge secured to said valve body below said outer flow port, said diaphragm being normally stretched over said grid in substantially full seating engagement with the convex surface thereof, and pilot means serving to effect direct fluid pressure loading of said diaphragm in response to main line pressure conditions.

9. A flexible diaphragm flow control device comprising, a hollow valve body having a flow inlet and a flow outlet, grid means providing a supporting structure of convex shape disposed within said body intermediate said inlet and outlet, the convex surface of said grid defining an annular valve seat, said grid having an inner flow port inwardly of said valve seat and an outer flow port outwardly of said said valve seat, said outer flow port communicating with said valve flow inlet and said inner flow port communicating with said valve flow outlet, an expansible diaphragm member overlying the convex surface of said grid, a diaphragm casing defining a plenum chamber overlying the convex surface of said grid and having its marginal edge secured to said valve body below said outer flow port, said diaphragm being normally stretched downwardly over said grid in substantially full seating engagement with the convex surface thereof, and pilot means serving to introduce a fluid loading pressure into said plenum chamber to effect pressure loading of said diaphragm toward a position of seating engagement with a convex surface of said grid in response to main line pressure conditions.

References Cited in the file of this patent

UNITED STATES PATENTS

| 848,739 | Gut | Apr. 2, 1907 |
|---|---|---|
| 1,269,721 | Kuntny | June 18, 1918 |
| 1,496,935 | Lemmon | June 10, 1924 |
| 1,793,396 | Haentjens | Feb. 17, 1931 |
| 2,353,143 | Bryant | July 11, 1944 |
| 2,677,390 | Davis | May 4, 1954 |

FOREIGN PATENTS

| 19,951 | Germany | of 1882 |
|---|---|---|
| 965,947 | France | Feb. 22, 1950 |